April 11, 1961     V. H. PAYNE     2,979,070
ENERGY STORAGE OR ACCUMULATOR DEVICE
Filed Nov. 27, 1956
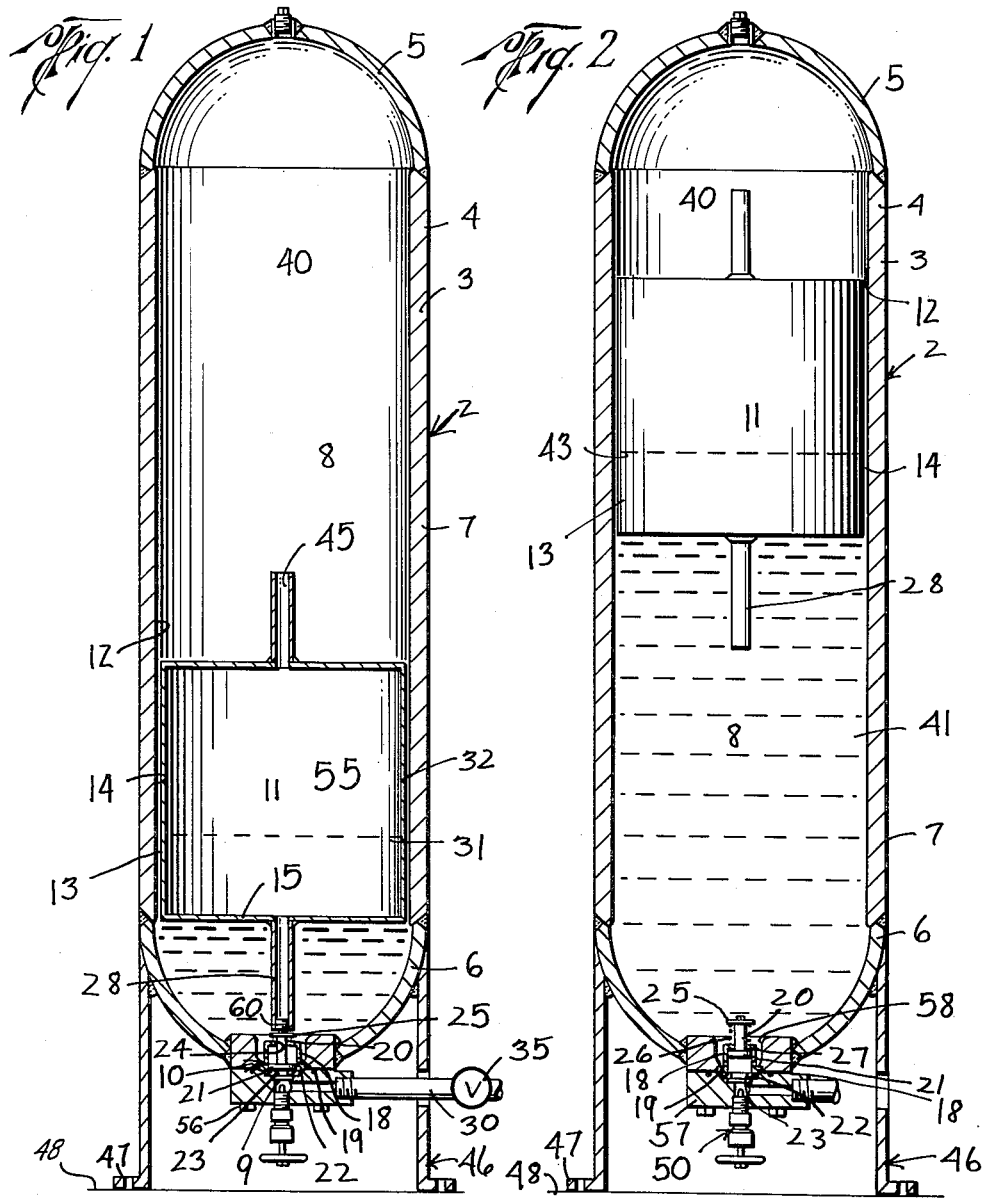
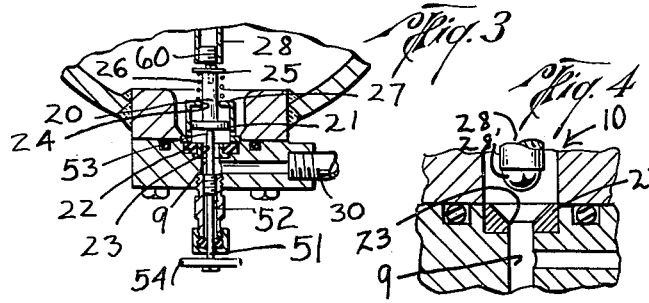
Vivian H. Payne
INVENTOR.
BY Hayden & Prauel
ATTORNEYS

United States Patent Office 2,979,070
Patented Apr. 11, 1961

2,979,070

ENERGY STORAGE OR ACCUMULATOR DEVICE

Vivian H. Payne, P.O. Box 9363, Houston, Tex.

Filed Nov. 27, 1956, Ser. No. 624,579

3 Claims. (Cl. 137—192)

The present invention relates to an energy storage device.

Various constructions have been proposed for the storage or accumulation of energy so that such accumulated energy may be utilized as desired for the actuation or operation of various mechanisms.

Some energy storage systems employ devices which are in the form of closed housings thereby providing a reservoir for receiving fluids under pressure, so that such fluids may be utilized as energy sources for operation or actuation of various mechanisms. Such energy storage devices have many industrial uses and applications, and by way of example only, and not for purposes of any limitation, they may be used for the operation of hydraulic presses, rams, and in the oil field have applications such as in the operation of blowout preventers. However, they may be and are used in many situations.

The energy devices to which the present invention relates are those wherein fluid is received and stored in a reservoir formed by a hollow housing so that the fluid may be discharged from the reservoir to supply energy as needed. More particularly the invention relates to an energy storage device wherein a pressure fluid and a hydraulic fluid are stored so that the stored energy therefrom may be used as needed.

Generally, the pressure medium used is in the form of an inert gas such as nitrogen, and while any suitable liquid may be used, it is generally desirable to use a hydraulic liquid, or hydraulic oil. The term "hydraulic oil" or "hydraulic liquid" is generally recognized in the art as defining a liquid having certain desirable characteristics such as a liquid that will not burn, freeze, foam and has certain other desirable physical and chemical characteristics that are suitable and desirable for use around almost any type of equipment without the fear of damage to the equipment by burning, exploding, freezing, etc., of the hydraulic fluid.

Heretofore, a great deal of difficulty has been encountered in energy accumulators, in that no satisfactory method has been devised for maintaining the liquid and fluid, such as gas separated in the accumulator, but in a relationship so that the gaseous medium may freely exert a pressure on the liquid to provide an accumulated source of energy which may be discharged from the energy storage device, as desired.

For example, accumulators of the type to which the present invention relate have, heretofore, generally employed some resilient membrane such as a rubber bag or a diaphragm which serves to separate the reservoir into a gas containing portion and a liquid containing portion. If the rubber element is in the form of a bag, it has been common practice to fill the bag with gas and inflate it and to then pump the liquid into the accumulator around the bag so as to decrease the volume of the bag, thereby increasing the gas pressure within the bag, which pressure in turn increases the effective pressure on the liquid. However, the rubber element or bag causes continual difficulty in that it is extremely difficult to provide a composition of matter which will withstand the pressure involved over an extended period of time or use and, therefore, it is necessary to frequently replace the rubber element which, of course, involves a good deal of expense, trouble and loss of time.

Some accumulators of the type to which the present invention relates, have proposed the use of a barrier which sealably, but slidably engages in the accumulator to serve as a means for separating the pressure fluid from the liquid. Such arrangement is extremely disadvantageous and hazardous in that the barrier tends to stick and should all of the liquid be discharged from the container while the barrier is stuck, a jar on the mechanism may cause the stuck barrier to be dislodged by the gas pressure with a tremendous force, thereby exploding the housing. In view of this inherent danger, this form of accumulator is not practical and is not used.

Other accumulators of the type to which the present invention relates have attempted to eliminate any form of barrier between the gas and the liquid, but it has been found that the gas and liquid tend to mix or form a solution so that the energy present in the gas is dissipated, thereby reducing the effectiveness of the mechanism so that it is unreliable and impractical.

Additional objections to accumulators of the type to which the present invention relates is that the valve means mounted in the opening in the housing through which the liquid is discharged sometimes becomes stuck in closed position so that it is impossible to release the energy accumulated in the mechanism. Also, such valve mechanisms have caused difficulty in charging the mechanism with fluid and liquid in that they become stuck in open position, thereby making it extremely difficult to properly charge the device for later use.

The present invention provides a construction for storing or accumulating energy which overcomes all of the above disadvantages.

An object of the present invention is to provide an energy storage device wherein pressure fluid and liquid are accumulated so that the liquid may be discharged from the device as required for an energy source, there being means floating in the liquid and serving as a barrier between the liquid and gas phase to maintain them separated while permitting the gas or fluid to freely act upon the liquid surface.

Still another object of the present invention is to provide an energy accumulator having an opening therein for charging it and which opening also serves as a means for discharging the liquid from the accumulator as desired, there being valve means in the opening constructed and arranged so that the valve means is normally urged to closed position as the device is being charged, but opens to permit charging and remains open after charging and is maintained in open position until the liquid is discharged to a predetermined level in the housing.

Still another object of the present invention is to provide a hydraulic accumulator wherein the valve controlling flow to and from the accumulator is urged to closed position during charging of the accumulator with fluids, but opens for charging with fluids, and is thereafter maintained in an open position during discharge of the hydraulic liquid or fluid from the accumulator, and which valve mechanism automatically closes when the liquid level reaches a predetermined point to inhibit escape of the charge of pressure fluid from the accumulator, and which valve mechanism automatically closes when the liquid level reaches a predetermined point to inhibit escape of the charge of pressure fluid from the accumulator.

Still a further object of the present invention is to provide an energy accumulator wherein a pressure fluid and liquid are stored so as to discharge the liquid from the accumulator as needed there being valve means regulating the discharge flow of the liquid from the accumulator and which valve means is maintained in open position until the liquid level in the accumulator reaches a predetermined point.

Yet a further object of the invention is to provide a construction and arrangement of an energy accumulator wherein a pressure fluid and the hydraulic liquid in the accumulator have a minimum of surface contact at their surface, but which construction and arrangement permits the pressure fluid to act without restraint against the liquid stored in the mechanism.

Still a further object of the invention is to provide an energy storage or accumulator which eliminates the necessity of providing a resilient membrane or bag for separating the pressure fluid and hydraulic fluid in the accumulator.

Still a further object of the invention is to provide an energy storage or accumulator device wherein the pressure fluid and hydraulic fluid are kept from contacting each other so as to prevent co-mingling of the pressure fluid and hydraulic fluid.

Yet a further object of the invention is to provide a construction and arrangement of an energy storage or accumulator wherein a pressure fluid and a hydraulic fluid are stored, the hydraulic fluid adapted to be discharged as an energy source as needed, which accumulator is constructed and arranged so that valve means which regulates the flow of liquid from the housing is maintained in open position for ready discharge of the liquid until the liquid level reaches a predetermined point whereupon the valve means closes so as to prevent the escape of the pressure medium from the energy storage device.

Yet a further object of the present invention is to provide in an energy storage device or accumulator, wherein a pressure fluid and hydraulic fluid are stored so that the hydraulic fluid may be discharged as needed as an energy source, a valve means for regulating the discharge flow of the liquid, which valve means is constructed and arranged so as to maintain an unrestricted flow of liquid from the housing until the liquid level in the housing reaches a predetermined point whereupon the valve means closes to prevent escape of the pressure fluid from the device.

Yet a further object of the invention is to provide a barrier in an energy accumulator wherein pressure fluid and a liquid are stored which barrier separates the liquid and fluid but permits the pressure fluid to freely act on the liquid at all times.

Yet a further object of the invention is to provide a barrier in an energy accumulator wherein pressure fluid and a liquid are stored which barrier separates the liquid and fluid but permits the pressure fluid to freely act on the liquid at all times, and valve means cooperatively associated with said barrier for closing off the accumulator when the liquid reaches a predetermined level.

Other objects and advantages of the present invention will become apparent from a consideration of the following description and drawings wherein:

Fig. 1 is a vertical sectional view illustrating a form of the present invention and showing a closed housing forming a reservoir with the barrier means at its lowermost position in the reservoir;

Fig. 2 is a vertical sectional view similar to Fig. 1 but representing the present invention fully charged with pressure fluid and hydraulic liquid;

Fig. 3 is a partial sectional view showing an enlargement of the valve means of the present invention and a safety release mechanism for use in connection therewith; and Fig. 4 is a partial sectional view showing an alternate embodiment of the valve means used with the present invention.

Attention is directed to Fig. 1 of the drawings wherein the embodiment of the present invention therein illustrated is generally indicated by the numeral 2. A housing 3 is provided which, in the present drawings, is illustrated as being in the form of a cylinder 4 having the ends 5 and 6 thereof closed to form a pressure vessel 7.

It can be appreciated that the form of the invention as shown in the drawings is best suited for cooperation with that particular configuration of the barrier means illustrated and described hereinafter. However, it should be fully understood that the invention may be in any configuration and the barrier means formed accordingly to cooperate therewith.

The closed housing or pressure vessel 7 defines a reservoir 8 for receiving a fluid therein. An opening 9 is provided in the pressure vessel 7 for admitting the fluid to the reservoir 8 and discharge of the fluid therefrom.

For the purposes of description of the present invention, the fluid herein referred to may be divided into a gas or pressure fluid portion, and a liquid portion. Generally speaking, the gaseous portion used in accumulators of the type to which the present invention relates may be of any suitable inert type and nitrogen has been found to serve the purpose quite well. Similarly, the liquid portion may be composed of any liquid and if the invention is to be used in climates where the temperature will remain above 32° F., water will serve quite well. Of course, where the device is to be used in temperatures that fall below 32° F., then it is desirable to use a non-inflammable, non-freezing liquid. Generally speaking, the term "hydraulic oil" or "hydraulic fluid" to those skilled in the art means a hydraulic fluid having certain desirable characteristics such as being non-inflammable, etc. (as previously pointed out herein) and such liquid presents obvious desirable characteristics for use with the present invention.

Suitable valve means indicated generally by the numeral 10 are provided for controling flow through the opening 9 in the vessel 7 which valve means will be more fully described hereinafter.

It is desirable to eliminate surface contact between the gas portion and the hydraulic liquid so as to inhibit co-mingling thereof, which eliminates or greatly reduces the effectiveness of accumulators such as the type to which the present invention relates. In order to accomplish this function, the present invention provides the barrier illustrated at 11 which acts to separate the liquid portion and the pressure fluid portion at all liquid levels in the housing 3. As previously mentioned, one of the disadvantages with accumulators of the type to which the present invention relates and which are in use at the present time is that such accumulators use a barrier in the form of a resilient membrane formed of rubber or the like. While such membrane serves to maintain the gas and liquid separate while permitting free action of the gas upon the liquid for the desired results, the membrane is not adapted to withstand stresses and strains through repeated use which is necessary in accumulators of this type.

The present invention overcomes this difficulty in that the barrier 11 reduces the amount of surface contact between the liquid and the gas portion in the reservoir 8, which barrier is not subject to the objections inherent with the membrane type presently in use.

As previously mentioned, the pressure vessel 7 of the present invention is in the form of a cylinder 4, and similarly, the barrier 11 is in a cylindrical form to closely fit adjacent the interior wall 12 of the reservoir 8 so that only a minimum amount of gas is exposed to the surface of the liquid.

In order to accomplish this, the barrier 11 is illustrated as being in the form of a hollow cylindrical float 13 shaped to conform with the cylinder form 4 and of a suitable size to fit therein. It is to be noted that the float 13 is only slightly smaller in diameter than the diameter of the cylinder 4 so that an annular space 14 is formed between the exterior side walls of the float 13 and the interior wall 12 of the reservoir 8. It is to be further noted that the float 13 forms a non-sealing fit within the reservoir 8 so that under no circumstances will the float 13 become stuck.

It is quite obvious that the only surface contact between the gas or pressure fluid and the liquid in the reservoir is in the annular space 14 between the inner wall 12 of the reservoir 8 and the float 13. The use of a float of cylindrical shape assures a constant area of contact between the pressurized gas and liquid throughout substantially the entire range of movement of the float, regardless of the vertical position of the float relative to the surface of the liquid.

Additionally, the float 13 is hollow so that the gas pressure is the same both on the inside and the outside thereof and such gas pressure is effective against the surface of liquid to exert a pressure thereon by acting against the lower inner surface 15 of the float.

The float 13 freely moves in response to changes or variations in the liquid level in the reservoir 8 so that it is effective at all times to separate the liquid and fluid pressure portions of the fluid in the reservoir, while not interfering with the gas pressure action on the liquid.

In addition to acting as a barrier, the float 13 of the present invention includes means for manipulating the valve means 10 in a desired manner so that the valve will operate in a desired manner. As disclosed herein, the construction is such that the valve 10 will remain closed as the reservoir 8 is being charged with pressure fluid and hydraulic liquid and will then remain open for ready discharge of the liquid as an energy source.

More particularly, the present invention and the valve means 10 overcomes some of the difficulties heretofore encountered with accumulators of the present type in that the valving arrangement automatically closes while filling of the reservoir 8, remains open for free discharge of the liquid from the accumulator as it is needed, and thereafter automatically closes to prevent loss of the pressure fluid from the reservoir 8.

The valve means 10 illustrated in Figs. 2 and 3 includes the cage 18 which is disposed over the opening 9 in housing 3, such cage being provided with any suitable number of openings 19 therein for the flow of pressure fluid and liquid therethrough. A valve stem 20 has the valve element 21 on the lower end thereof so as to seat on the seat 22, such seat having the opening 23 therein which communicates with the opening 9.

The valve stem 20 extends upwardly through the opening 24 in the cage 18 as illustrated in the drawings and a stop 25 is secured to the outer end of the valve stem 20 above housing 18. A spring 26 rests on the top 27 of the cage 18 and abuts against the stop 25 as more clearly illustrated in Figs. 2 and 3 of the drawings. This spring normally tends to urge the valve to a position off the valve seat 22 so as to open the opening 9 communicating with the reservoir 8.

A projection 28 depends from the float 13 and is adapted to engage the top of stop 25, such float being weighted a suitable amount so as to overcome the tension in spring 26 and normally maintain the valve 21 on valve seat 22 to close off communication between opening 9 and the reservoir 8 as the reservoir is being charged with fluid.

When the reservoir 8 has been charged with a desired amount of pressure fluid and liquid, the float 13 rises off valve 10 so that the spring 26 urges the valve stem 20 upwardly to communicate opening 9 and reservoir 8. This construction prevents the valve mechanism 10 from becoming jammed in closed position when it is desired to obtain liquid from the accumulator for actuating of various mechanisms, but of course, as the liquid level in the reservoir 8 recedes, the float 13 and particularly projection 28 depending therefrom will again contact the stop or rest 25 on the top of valve stem 20 so as to push the valve down and thereby close off the opening 9 to prevent the escape of the pressure fluid from the accumulator.

Fig. 4 illustrates an alternate embodiment of the valve means 10. In the Fig. 4 embodiment the valve means consists of a shaped end 28' on the lower projection 28 of float 13.

In the Fig. 4 embodiment, the cage 18, valve stem 20, valve element 21 and spring 26 of the Figs. 2 and 3 modification are all eliminated. When the float 13 moves to its lowermost position in the reservoir, the end 28' of projection 28 engages on seat 22 to close off the opening 23 therethrough which eliminates, or prevents further discharge from the reservoir.

To further aid in describing the operation and functioning of the present invention, it will be assumed that it is built in the 20 gallon size. Of course, it seems quite obvious that it may be constructed in any suitable size, as desired, and the present description is merely for purposes of illustration. To charge the reservoir 8, a fitting 30 is provided, such fitting also serving as a means for discharging the liquid from the accumulator, as desired. A suitable gaseous medium such as nitrogen is passed through the fitting and thereupon acts against the spring loaded and weight loaded valve 10 and unseats it and thereupon passes to the reservoir 8 in the pressure vessel 7. The passage of gas is continued until (with a 20 gallon size of the present example) the nitrogen pressure within the reservoir 8 reaches 875 pounds per square inch. After the reservoir 8 has been charged with pressure fluid, for example nitrogen, such gas pressure further aids in maintaining the valve 10 closed which helps to lock the gas charge in the reservoir.

The hydraulic liquid or oil, or other suitable liquid to be stored in the accumulator for operation of various industrial mechanisms may thereupon be passed into the reservoir 8 through the same fitting 30. It can be appreciated that as the hydraulic liquid is passed into the reservoir 8, the float 13 will remain in a position so as to maintain the valve 10 seated until enough liquid has been discharged into the reservoir 8 to overcome the weight of float 13 and raise the float 13 off the valve stem 20. In the present example, the float may weigh 20 pounds and it is noted that the liquid reaches a level as represented by the line 31 before the float 13 tends to move from engagement with the stop or rest 25 on the top of valve stem 20. Of course, as previously mentioned, the float 13 is hollow and the side walls 32 as well as the bottom 15 are closed so that no liquid may pass into the float as the reservoir 8 is being charged with the liquid.

The level of liquid as represented by the line 31 in Fig. 1 of the drawings may be referred to as the resident fluid level in the accumulator because the liquid level will not go below this point after the vessel has been once charged with gas and liquid.

Additional liquid is pumped into the reservoir 8 to the level as illustrated at 43 in Fig. 2 whereupon the float 13 moves upwardly in the reservoir as illustrated in Fig. 2, the amount of liquid or volume of liquid being supplied until the nitrogen pressure has been raised from its initial amount of 875 pounds per square inch to 2000 pounds per square inch.

In the illustration given, the amount of liquid required to raise the float 13 from the position of Fig. 1 to the position of Fig. 2 is 10 gallons. However, as previously mentioned, the illustration is termed a "20 gallon" container and is so termed because the total volume of the vessel is 20 gallons. It can be appreciated that once the liquid level has floated the member 13 off the valve stem 20, the valve moves away from the valve seat 22 so that opening 9 is thereafter in communication with the liquid in reservoir 8 and will remain open until the liquid level is reduced to an amount so as to cause member 13 to push down on stem 20 to close the valve.

In order to prevent escape of the liquid from the accumulator until it is needed, a suitable valving arrangement as illustrated at 35 may be provided in the fitting 30. The valving arrangement 35 may be operated electronically or mechanically or manually or in any suitable way, depending upon the manner in which the accumulator is to be used. The manner of actuation of the valve 35 is not pertinent to the present invention, may be accomplished in any suitable manner and it is believed unnecessary to give a detailed description herein. Of course, the valve 35 will remain closed after charging of the reservoir 8 until it is desired to use the hydraulic fluid accumulated in the pressure vessel 7 for actuation or operation of some industrial mechanism such as blowout preventers.

As previously mentioned, the construction and arrangement of the pressure vessel 7, as well as the float 13, is such that the surface contact between the gas or pressure fluid in the upper portion 40 of the reservoir 8 and the liquid in the lower portion 41 of the reservoir 8 is at a minimum at all times. Of course, it is absolutely necessary that the float or member 13 be freely movable within the housing 3 and move in accordance with variations in the liquid level in the reservoir 8.

By way of example, and not for purposes of limitation, it has been discovered that a total clearance of ⅛" between the float 13 and the reservoir works quite well. Of course, other clearances may be used without departing from the scope of the invention, and the above is not given for purposes of limitation as to the exact clearance used.

It seems obvious that as the liquid is used from the accumulator the float 13 will move downwardly until it again contacts the stop 25 of the valve stem 20 whereupon the valve element 21 is moved to seating position on the seat 22 to close off opening 9 relative to reservoir 8. In this manner, the escape of the gaseous medium in the upper part 40 of the pressure vessel 7 is eliminated. Of course, it is customary in accumulators of this type to provide means whereby the device is continually recharged with liquid when the liquid level is reduced to a predetermined amount. Such automatic refilling is well known, forms no part of the present invention and it is, therefore, believed unnecessary to give a detailed description herein.

However, particular attention is directed to the fact that the barrier 11 in the form of the hollow float or hollow member 13 provides a construction so that the gas pressure in the reservoir 8 is effective against the surface of the liquid in the reservoir at all times, but which construction inhibits contact between the liquid surface and the gas thereabove so as to discourage comingling of the gas and liquid in the storage or pressure vessel 7. Additionally, the construction and arrangement of the valve means 10 is such that the valve means will always be in open position after the device is charged, thereby eliminating the possibility of the valve becoming stuck in closed position which would prevent the discharge of the liquid from the device when needed, which is often encountered with constructions presently in use.

Of course, it seems obvious that any suitable size and arrangement of the present invention may be provided, as desired, and of course, in such circumstances the particular physical dimensions of the invention will vary as well as the size and arrangement of the float. The present invention may be arranged in a substantially vertical position to inhibit overflow of the liquid in the lower portion 41 of the reservoir 8 into the open end 45 of the barrier 11 and to this end, any suitable mounting may be provided for the invention as illustrated at 46 and is shown as including footings 47 which may be welded or bolted to a support surface 48.

Under some circumstances it may be desirable to completely drain the accumulator of the present invention of all fluid content, both gas and liquid portion, after it has been charged. Since the valve 10 of the present invention closes when the liquid level is reduced in the container so as to prevent escape of the pressure fluid thereabove, it is therefore necessary to provide some arrangement for unseating the valve 10 to permit removal of the liquid and gas from the pressure vessel 7 under such circumstances.

To accomplish this function, a fitting 50 is provided which fitting includes the stem 51 rotatably and threadedly engaged internally of the fitting in any suitable manner as illustrated at 52. The inner end 53 of the stem is adapted to engage the valve element 21 when the handle 54 on the outer end of stem 51 is rotated. Thus, the valve element may be moved up off the seat 22 whereupon the resident fluid in the pressure vessel 7 may flow through the opening 9. After all of the liquid has been discharged from the pressure vessel the inert gaseous medium may also be discharged from the mechanism.

If for any reason it may be desired to gain access to the reservoir 8 and to the interior 55 of the float 13 for draining of such float, bolts 56 may be disengaged so as to permit removal of the element 57 from the end 6 of the cylinder 4.

This permits the cage 18, valve stem 20 and valve element 21 as well as spring 26 and cap 25 to be removed from the reservoir 8 through opening 58 so that the plug 60 in the end of depending projection 28 of float 13 may be removed, for access to the interior 55 of float 13 for drainage thereof or for any other purpose.

To further amplify and describe, it will be assumed that the cylinder 4 has been provided with the ends 5 and 6 and mounted on suitable supports as illustrated in the drawings. The reservoir 8 is charged to a desired pressure with a suitable inert gaseous medium such as nitrogen. During such gaseous filling the valve 10, of course, is unseated to permit the entry of the gas into the reservoir 8, but such valve reseats after the reservoir has been charged with the gas so as to prevent the escape thereof. The hydraulic liquid is then pumped into the bottom of the reservoir and when the amount of liquid is sufficient to float the barrier 11, the valve means 10 is opened. The pumping of liquid is continued until the desired amount of liquid has been supplied to the reservoir so as to compress the nitrogen or pressure fluid a desired amount, which pressure fluid is to act upon the liquid and discharge it to supply energy for the actuation or operation of various hydraulic industrial mechanisms.

So long as the barrier 11 in the form of hollow float 13 remains off valve 10, the liquid may be easily discharged from the reservoir. It is to be particularly noted that the construction and arrangement of the valve means is such that the valve will remain open whereby the liquid can be discharged and there is no possibility of the valve mechanism 10 becoming jammed in closed position to prevent the discharge of the liquid. However, when the liquid is reduced to a predetermined level in the bottom 41 of the reservoir, the projection 28 on the float 13 again engages the stop 25 or the top of the valve stem 20 so as to overcome the spring pressure 26 tending to maintain the valve open, and closes the valve as illustrated in Fig. 1. This acts as a safety mechanism to prevent the escape of the pressure fluid from the reservoir.

It seems obvious that when the valve means 10 assumes the construction shown in Fig. 4, the operation and function of the invention on the discharge cycle is the same, since the opening 9 in the housing is open to discharge fluid therefrom until the end 28' of projection 28 contacts seat 22 to shut off flow. During filling, the opening 9 remains open at all stages and of course suitable means such as represented by auxiliary valve means illustrated at 35 may be used to aid during the filling and discharge cycles as desired.

Broadly the invention relates to an energy storage or accumulator device and arrangement and particularly to an energy storage and accumulator device which overcomes objections of energy storage devices presently in use.

What is claimed is:

1. In a device wherein liquid is acted upon by a gaseous pressure to provide a source of energy, a cylindrical housing having its ends closed to form a reservoir for receiving the liquid and gas, there being opening means in said housing for charging the reservoir with the gas and liquid and for discharging the liquid from the housing, a hollow cylindrical float means within said housing, said float having an opening therein exposed to the gas within said reservoir and closed to move up and down in said housing in response to variations in the liquid level within said reservoir, said cylindrical float being slightly smaller in diameter than the diameter of said reservoir, said cylindrical float having substantially the same cross-sectional area substantially throughout its extent whereby the contact area between the liquid and gas in the reservoir is substantially the same regardless of the liquid level and pressure of the gas in said housing.

2. The combination recited in claim 1 including valve means for controlling the discharge of liquid from said housing, spring means normally urging said valve means to open position whereby liquid may be discharged from said housing as it is needed, and said float including means depending below the bottom thereof to engage said spring loaded valve means to close said valve means when the liquid is reduced to a predetermined level in said housing to inhibit escape of the pressure gas from said housing.

3. A device wherein liquid is acted upon by a gaseous pressure so as to provide a source of energy comprising, a cylindrical housing having its ends closed to form a reservoir for receiving the gas and liquid, opening means in said housing for discharging liquid therefrom, valve means for controlling the discharge of the liquid from the housing, means for reducing the contact area between the surface of the liquid and pressure gas acting thereon, said last-mentioned means including a hollow cylindrical float which is open to the gas in said housing and which is closed at its bottom to float in the liquid in said housing, said cylindrical float being substantially the same in cross-sectional area as the cross-sectional area of the reservoir to form a non-sealing fit with the reservoir whereby the contact area between the liquid and pressure gas in the reservoir is reduced substantially throughout the extent of said float, spring means normally urging said valve means to open position whereby the liquid may be discharged from said housing as it is needed, said float including means depending below its bottom to engage said spring loaded valve means to close said valve means when the liquid is reduced to a predetermined level in said housing to inhibit escape of the pressure gas from said housing.

References Cited in the file of this patent

UNITED STATES PATENTS

| 436,564 | Kelly | Sept. 16, 1890 |
| 1,642,023 | Haight | Sept. 13, 1927 |
| 1,959,640 | Peters | May 22, 1934 |
| 2,582,819 | Daily | Jan. 15, 1952 |
| 2,721,580 | Greer | Oct. 25, 1955 |
| 2,731,038 | Purcell | Jan. 17, 1956 |